United States Patent
Cabeza Gozalo et al.

(10) Patent No.: US 12,513,787 B2
(45) Date of Patent: Dec. 30, 2025

(54) INDUCTION ENERGY TRANSMISSION SYSTEM

(71) Applicant: BSH Hausgeräte GmbH, Munich (DE)

(72) Inventors: Tomas Cabeza Gozalo, Saragossa (ES); Alberto Dominguez Vicente, Saragossa (ES); Javier Lasobras Bernad, Ejea de los Caballeros (ES); Sergio Llorente Gil, Saragossa (ES); Julio Rivera Peman, Cuarte de Huerva (ES)

(73) Assignee: BSH Hausgeräte GmbH, Munich (DE)

( * ) Notice: Subject to any disclaimer, the term of this patent is extended or adjusted under 35 U.S.C. 154(b) by 914 days.

(21) Appl. No.: 17/762,757

(22) PCT Filed: Sep. 24, 2020

(86) PCT No.: PCT/EP2020/076684
§ 371 (c)(1),
(2) Date: Mar. 23, 2022

(87) PCT Pub. No.: WO2021/069221
PCT Pub. Date: Apr. 15, 2021

(65) Prior Publication Data
US 2022/0418053 A1 Dec. 29, 2022

(30) Foreign Application Priority Data
Oct. 8, 2019 (EP) .................................... 19382875

(51) Int. Cl.
*H05B 6/12* (2006.01)
*H05B 6/06* (2006.01)

(52) U.S. Cl.
CPC ........... *H05B 6/1236* (2013.01); *H05B 6/062* (2013.01)

(58) Field of Classification Search
CPC .. H05B 6/1236; H05B 6/062; H05B 2213/06; Y02B 40/00
See application file for complete search history.

(56) References Cited

U.S. PATENT DOCUMENTS

| | | | |
|---|---|---|---|
| 2018/0352613 A1 | 12/2018 | Llorente Gil | |
| 2019/0125120 A1* | 5/2019 | Jenkins | ................. F24C 15/105 |
| 2020/0205240 A1 | 6/2020 | Lee | |

FOREIGN PATENT DOCUMENTS

| | | | |
|---|---|---|---|
| DE | 102009000273 A1 * | 7/2010 | ............. F24C 7/082 |
| WO | 2014016032 A1 | 1/2014 | |
| WO | 2019211718 A1 | 11/2019 | |

OTHER PUBLICATIONS

International_Search_Report_PCT_EP2020_076684 dated Dec. 11, 2020.

* cited by examiner

*Primary Examiner* — Edward F Landrum
*Assistant Examiner* — Kuangyue Chen
(74) *Attorney, Agent, or Firm* — Michael E. Tschupp; Andre Pallapies; Brandon G. Braun (57) ABSTRACT

An induction energy transmission system includes a supply unit having a supply induction element to inductively provide energy in an operating state. A receiving unit receives at least part of the energy provided by the supply induction element in the operating state. A sensor unit detects a measurement variable and a first information channel transmits a first signal between the receiving unit and the supply unit, with the first signal coding the measurement variable. A second information channel which differs from the first information channel transmits a second signal between the receiving unit and the supply unit, with the second signal coding the measurement variable.

18 Claims, 5 Drawing Sheets

INDUCTION ENERGY TRANSMISSION SYSTEM

CROSS-REFERENCES TO RELATED APPLICATIONS

This application is the U.S. National Stage of International Application No. PCT/EP2020/076684, filed Sep. 24, 2020, which designated the United States and has been published as International Publication No. WO 2021/069221 A1 and which claims the priority of European Patent Application, Serial No. 19382875.3, filed Oct. 8, 2019, pursuant to 35 U.S.C. 119(a)-(d).

The contents of International Application No. PCT/EP2020/076684 and European Patent Application, Serial No. 19382875.3 are incorporated herein by reference in their entireties as if fully set forth herein.

BACKGROUND OF THE INVENTION

The invention relates to an induction energy transmission system, in particular an induction cooking system, as well as a method for operating an induction energy transmission system, in particular an induction cooking system.

An induction energy transmission system, which has a supply unit which is configured as a cooktop and a receiving unit which is configured as a positioning unit, is already known from the prior art. Positioning units which have an item of cookware and a support unit which are arranged in an operating state between the item of cookware and a positioning plate, which is configured in particular as a cooktop plate, are known. In this case, components of the positioning unit, such as for example a transmitting unit, are integrated in the support unit. Alternatively, positioning units having in each case a housing unit, which forms an external housing and which defines a receiving space for receiving food, are known. In this case, components of the positioning unit are integrated in the housing unit. In an operating state, the supply unit transmits energy inductively to the receiving unit by means of a supply induction element. The receiving unit has a transmitting unit which in the operating state transmits a signal to the supply unit. In this case the signal characterizes an identification parameter, whereby in the operating state the receiving unit is identified as a function of the signal of the transmitting unit and, in particular, an association between a supply induction element of the supply unit and the receiving unit is possible.

BRIEF SUMMARY OF THE INVENTION

The object of the invention, in particular, is to provide a system of the generic type having improved characteristics in terms of safety.

The invention is based on an induction energy transmission system, in particular an induction cooking system, and advantageously an induction cooktop system, having at least one supply unit which has at least one supply induction element which inductively provides energy in at least one operating state, having at least one receiving unit which receives at least part of the energy provided by the supply induction element in the operating state, having at least one sensor unit for detecting at least one measurement variable, and having a first information channel for transmitting at least one first signal between the receiving unit and the supply unit, which first signal codes the measurement variable.

It is proposed that the induction energy transmission system has at least one second information channel, which differs from the first information channel, for transmitting at least one second signal between the receiving unit and the supply unit, which second signal codes the measurement variable. By means of the embodiment according to the invention a high degree of safety may be achieved, in particular for a user. In particular, information transmitted via the first information channel by means of a first signal may be transmitted again and/or in parallel by a second signal via the second information channel and verified thereby. As a result, in particular, a correct transmission of a measurement variable detected by means of the sensor unit may be ensured, whereby in particular malfunctions and risks potentially associated therewith for a user may be reduced. Additionally, a high degree of functionality and thus a high degree of user convenience and/or a simple and/or convenient usability may be permitted and a user satisfaction may be increased.

An "induction energy transmission system", in particular an "induction cooking system" and advantageously an "induction cooktop system", is intended to be understood to mean, in particular, a system which has at least one supply unit, in particular at least one induction cooking appliance and advantageously at least one induction cooktop, and which has a main functionality in the form of transmitting energy. For example, the induction energy transmission system could be configured as an induction hand-held power tool system. In particular, the supply unit and/or the receiving unit could be configured as a hand-held power tool, such as for example a drill and/or an electric screwdriver and/or a hammer drill and/or a saw. Alternatively or additionally, the supply unit and/or the receiving unit could be configured as a transformer. The induction energy transmission system could be provided, in particular, for at least one self-propelled implement and/or for at least one remote controller and/or for at least one remote control. In particular, the receiving unit could be configured as a self-propelled implement and/or as a remote controller and/or as a remote control. The self-propelled implement could be configured, for example, as a self-propelled mower and/or as a self-propelled vacuum cleaner. The remote controller and/or the remote control could be provided, in particular, for an operation and/or for a control of at least one blind and/or at least one electrical appliance, in particular at least one household electrical appliance, and/or at least one model object, such as for example a model automobile and/or a model aircraft and/or a model boat. Moreover, the receiving unit of the induction energy transmission system could be configured as a means of transportation, in particular as an electric motor vehicle or as a hybrid motor vehicle or as an electric bicycle or as an electric scooter or as another fully or partially electrically operated means of transportation. Preferably, the induction energy transmission system is configured as an induction cooking system. For example, the induction energy transmission system could be configured as an induction oven system and/or as an induction grill system. In particular, the supply unit and/or the receiving unit could be configured as an induction oven and/or as an induction grill. Advantageously, the induction energy transmission system is configured as an induction cooktop system. The supply unit and/or the receiving unit is then configured, in particular, as an induction cooktop.

A "supply unit" is intended to be understood to mean, in particular, a unit which in at least one operating state inductively provides energy and which, in particular, has a main functionality in the form of providing energy. For providing energy, the supply unit has, in particular, at least one supply induction element which, in particular, has at least one coil, in particular at least one primary coil, and which provides energy inductively, in particular in the operating state.

An "induction element" is intended to be understood to mean, in particular, an element which in at least one operating state provides and/or receives energy, in particular for the purpose of transmitting energy inductively. In particular, in the operating state an induction element which is configured as a supply induction element provides energy, in particular, for the purpose of transmitting energy inductively. The supply induction element could have, in particular, at least one coil, in particular at least one primary coil, which could be provided, in particular, for transmitting energy inductively to at least one secondary coil. The secondary coil, for example, could be part of the receiving unit, in particular at least of a receiving induction element of the receiving unit. In particular, in the operating state an induction element which is configured as a receiving induction element receives energy, in particular for the purpose of transmitting energy inductively, and namely, in particular, from the supply induction element. The receiving induction element could have, in particular, at least one coil, in particular at least one secondary coil, which can be provided in particular for receiving energy inductively from the supply induction element.

The supply induction element could be configured, for example, as a transformer element. Alternatively or additionally, the supply induction element could be configured, in particular, as an induction heating element and could be provided, in particular, for transmitting energy to at least one receiving unit which is configured as a positioning unit, in particular for the purpose of heating the positioning unit. In at least one operating state, the supply induction element could provide, in particular, an alternating field, in particular an electromagnetic alternating field, with a frequency of at least 1 Hz, in particular of at least 2 Hz, advantageously of at least 5 Hz and preferably of at least 10 Hz. In particular, in at least one operating state the supply induction element could provide, in particular, an alternating field, in particular an electromagnetic alternating field, with a frequency of a maximum of 150 kHz, in particular of a maximum of 120 kHz, advantageously of a maximum of 100 kHz and preferably of a maximum of 80 kHz. A supply induction element which is configured, in particular, as an induction heating element could provide in at least one operating state, in particular, a high-frequency alternating field, in particular a high-frequency electromagnetic alternating field, with a frequency of at least 15 kHz and in particular of a maximum of 100 kHz.

For example, the supply unit could have exactly one supply induction element. The supply unit could however also have at least two, in particular at least three, advantageously at least four, particularly advantageously at least five, preferably at least eight and particularly preferably a plurality of supply induction elements which could provide, in particular in the operating state, in each case energy inductively and namely in particular to a single receiving unit, in particular, or to at least two or more receiving units. In particular, any one of the supply induction elements could be arranged, in particular, in the vicinity of at least one other of the supply induction elements. At least some of the supply induction elements could be arranged, for example, in a row and/or in the form of a matrix.

A "receiving unit" is intended to be understood to mean, in particular, a unit which in at least one operating state receives energy, in particular inductively, and which in particular has at least one main function. The receiving unit could have, for example, at least one consumer which in the operating state, in particular, could consume energy. The receiving unit could be, for example, a hand-held power tool, such as for example a drill and/or an electric screwdriver and/or a hammer drill and/or a saw, and/or an automobile and/or a mobile device, such as for example a laptop and/or a tablet and/or a mobile telephone, and/or a remote controller and/or a remote control and/or a self-propelled implement. Moreover, the receiving unit could be configured as a means of transportation, in particular as an electric motor vehicle or as a hybrid motor vehicle or as an electric bicycle or as an electric scooter or as another fully or partially electrically operated means of transportation. A main function of the receiving unit could include, for example, drilling and/or hammering and/or sawing and/or screwing and/or data processing and/or telephoning and/or traveling. In the case of an induction energy transmission system configured as an induction cooking system, a main function of the receiving unit is, in particular, receiving energy. For example, the energy received by the receiving unit in the operating state, in particular, could be converted directly into at least one further energy type, such as for example into heat. In particular, the receiving unit could be free of receiving induction elements. Preferably, the receiving unit has at least one receiving induction element for receiving inductive energy. The receiving induction element could have, for example, at least one coil, in particular at least one secondary coil.

A "sensor unit" is intended to be understood to mean, in particular, a unit which in at least one operating state detects and processes at least one measurement variable. The sensor unit has at least one sensor element. The sensor unit could also have, in particular, a plurality of sensor elements. A "sensor element" is intended to be understood to mean in this context, in particular, an element which is assigned to the sensor unit and which may be configured, in particular, as a sensor and in at least one operating state detects quantitatively and/or qualitatively at least one measurement variable and/or at least one physical and/or chemical characteristic in the environment thereof and converts it into an electrical signal for further processing, wherein the detection may take place actively, such as in particular by generating and emitting an electrical measurement signal, and/or passively, such as in particular by detecting characteristic changes of a sensor component. A sensor element could be configured, for example, as a temperature sensor or as a weight sensor or as a volume sensor or as a humidity sensor. Various other sensor elements which appear expedient to the person skilled in the art are conceivable.

A "measurement variable" is intended to be understood to mean, in particular, a measurable physical variable. A measurement variable could be, for example, a temperature and/or a mass and/or a volume and/or a material quantity and/or a power and/or a time and/or a pressure and/or a relative and/or absolute humidity and/or a material composition. Alternatively or additionally, a measurement variable could be a qualitative variable which describes a state, for example an operating state or a cooking state or a charging state. In principle, all measurement variables which appear expedient to the person skilled in the art are conceivable.

"Coded" is intended to be understood to mean, in particular, converted and/or translated into a specific format and, in particular, a format which is suitable for an efficient transmission and/or storage. In particular, a coding may include a process of a conversion from analog to digital and/or from digital to analog. It is conceivable that a coding also comprises a step of encryption in order to block, for example, an unauthorized access to information coded in a signal.

An "information channel" is intended to be understood to mean, in particular, the entirety of all units, elements and transmission paths which are involved in a transmission of at least one signal from at least one transmitter to at least one receiver. In particular, an information channel comprises at least one part of the supply unit and at least one part of the receiving unit. A "transmission path" is intended to be understood to mean, in particular, a path via which a signal to be transmitted may be transmitted from at least one transmitter to at least one receiver. A transmission path in this case may be wired, wherein a transmission medium in this case may be an electrically conductive metal cable and/or a line or an optical waveguide consisting, for example, of glass, quartz or synthetic fibers. Preferably, a transmission path inside an information channel is wireless and comprises at least one electromagnetic wave, wherein in this case a transmission medium of the information channel could be air, for example.

The supply unit could be configured, for example, as an energy charging device, in particular as an induction energy charging device and could be provided, in particular, to transmit energy by means of the supply induction element to at least one receiving unit which could be configured, in particular, as a mobile device, such as for example a laptop and/or a tablet and/or a mobile telephone, and/or as a hand-held power tool and/or as a self-propelled implement and/or as a remote controller and/or as a remote control. Moreover, the receiving unit could be configured as a means of transportation, such as for example as an electric motor vehicle and/or a hybrid motor vehicle and/or as an electric bicycle and/or as an electric scooter and/or as another fully or partially electrically driven means of transportation, wherein in these cases the supply unit could be configured as a charging station or charging pole, or the like and, for example, could be integrated on or in a parking facility. Preferably, the supply unit is configured as a cooking appliance, in particular as an induction cooking appliance, such as for example as a cooktop, in particular as an induction cooktop and/or as an oven, in particular as an induction oven and/or as a grill, in particular as an induction grill. In particular, by means of the energy provided by the supply induction element, the supply unit heats at least one part of the receiving unit, in particular at least one receiving space of the receiving unit. As a result, the receiving unit may be supplied, in particular, with the energy provided for the receiving unit, whereby in particular optimal cooking results and/or a reliable operational efficiency of electrical and/or electronic units integrated in the receiving unit are/is achieved.

A "receiving space" is intended to be understood to mean, in particular, a spatial region which, in the operating state in which the supply unit, in particular, transmits energy to the receiving unit, is defined at least to a large part by the receiving unit and in which, in particular, food may be arranged in the operating state. The food could be arranged, in particular, in fluid form, in particular in liquid form and/or at least to a large part in liquid form, and/or in solid form in the receiving space. Food may be cooked, in particular, in a particularly efficient and/or targeted manner thereby, since in particular an energy required for a cooking may be accurately transmitted.

In an advantageous embodiment of the present invention, it is proposed that the receiving unit is configured as an item of cookware, in particular as an item of induction cookware. The receiving unit which is configured as an item of cookware advantageously has at least one receiving induction element which is configured as a secondary coil. The receiving induction element supplies at least one electrical heating element, preferably an electrical resistance heating element, with a part of the energy received by the supply induction element. As a result, advantageously at least one food to be cooked, which is arranged during a cooking process in the receiving space of the item of cookware, may be accurately supplied with the energy provided for one respective cooking process, whereby in particular optimal cooking results may be achieved. Alternatively or additionally, the receiving unit which is configured as an item of cookware could have at least one, in particular ferromagnetic, base plate which is arranged below the receiving space and in which eddy currents are induced by the energy inductively provided by the supply induction element, which eddy currents heat the base plate for heating a food to be cooked located in the receiving space.

In an advantageous alternative embodiment of the present invention, it is proposed that the receiving unit may be configured as a support unit for positioning an item of cookware. For example, a receiving unit which is configured as a support unit could consist of at least one magnetic, in particular at least one ferromagnetic, material and as a result advantageously said receiving unit may permit, in particular, a heating of an item of cookware which is not suitable for induction and/or which is non-magnetic, in particular which is non-ferromagnetic, by means of the energy provided by the supply induction element. Moreover, advantageously a transmission of heat from the item of cookware to a positioning plate may be at least substantially prevented thereby.

It might be conceivable, for example, that the first information channel has a wired transmission unit and a wired reception unit for an electrical and/or optical transmission of a first signal. Alternatively or additionally, it is conceivable that the first information channel has at least two radio transmitters and at least two radio receivers and could be suitable for a bidirectional signal transmission. Advantageously, however, the first information channel has at least one radio transmitter and at least one radio receiver. As a result, a cost-effective wireless transmission of a first signal may advantageously take place between the supply unit and the receiving unit. Moreover, in particular, advantageously a user convenience may be increased thereby.

It is further proposed that a transmission of the first signal takes place between the radio transmitter and the radio receiver according to the Bluetooth standard. As a result, in particular, a reliable transmission of the first signal may advantageously take place between the supply unit and the receiving unit. Alternatively or additionally, it might be conceivable that a transmission of the first signal between the radio transmitter and the radio receiver takes place according to a different radio standard, for example according to the wireless LAN standard or the Z-wave standard or the Zig-Bee standard or a different radio standard which appears expedient to a person skilled in the art for a transmission of the first signal.

It is further proposed that the second information channel comprises the supply induction element and at least one receiving induction element of the receiving unit which is configured as a reception induction element. As a result, advantageously a second signal which codes the measurement variable may be transmitted between the supply unit and the receiving unit. In particular, as a result, a second signal may be transmitted between the supply unit and the receiving unit by means of an energy transmission signal. As a result, advantageously an embodiment which is compact and/or which has a reduced number of components may be achieved. A "reception induction element" is intended to be understood to mean, in particular, an induction element which in at least one operating state receives an electromagnetic signal, in particular for the purpose of an inductive signal transmission. The reception induction element could, in particular, comprise at least one coil, in particular at least one secondary coil, which could be provided in particular for inductively receiving an electromagnetic signal provided by the supply induction element. The reception induction element may be a receiving induction element, which implements as a main function a reception of the energy provided by the supply induction element and additionally fulfills the function of a reception of a further signal which is different from an energy transmission signal, in particular of a second and/or third signal. Alternatively, a reception induction element may be configured differently from a receiving induction element and exclusively fulfill a function of a further signal which is different from an energy transmission signal, in particular of a second and/or a third signal. The receiving unit may have a plurality of reception induction elements.

For example, the signal could be modulated to an energy transmission signal of the supply unit and/or could be identical to the energy transmission signal of the supply unit. In particular, an energy transmission signal of the supply unit and the second signal could have the same frequency and/or multiples of the same frequency. As a result, in particular, an embodiment which is compact and/or which has a reduced number of components may be achieved, whereby in particular low costs may be achieved.

It is further proposed that the second signal is frequency modulated and/or amplitude modulated and/or duty cycle modulated. In particular, at least one piece of information which is coded in the second signal and/or a third signal and/or may be transmitted by means of the second signal and/or the third signal is modulated by at least one frequency and/or at least one amplitude and/or at least one duty cycle, in particular, to an energy transmission signal of the supply unit. The second signal and/or the third signal could correspond, in particular, to a harmonic of an energy transmission signal of the supply unit.

As a result, in particular, a simple and/or reliable transmission of the second signal and/or the third signal may be ensured. Alternatively or additionally, it might be conceivable that the second signal and/or the third signal correspond/corresponds to the energy transmission signal of the supply unit. A "frequency modulation" is intended to be understood to mean, in particular, a modulation method in which a carrier frequency, for example a frequency of an energy transmission signal or a network frequency is changed in order to transmit a further signal. An "amplitude modulation" is intended to be understood to mean, in particular, a modulation method in which an amplitude of a carrier signal, for example an amplitude of an energy transmission signal is changed in order to transmit a further signal. A "duty cycle modulation" is intended to be understood to mean, in particular, a modulation method in which a duty cycle, i.e. a ratio of a pulse duration of a carrier signal to a period duration of a carrier signal, for example of an energy transmission signal, is changed in order to transmit a further signal.

It is further proposed that the sensor unit has at least one sensor element which is integrated in the supply unit. As a result, for example, advantageously a high level of convenience for a user may be provided. Alternatively or additionally, it might be conceivable that the sensor unit may have an external sensor element which may be connected, for example, via a cable or wirelessly, for example to the supply unit.

It is further proposed that the sensor unit has at least one sensor element, in particular a further sensor element, which is integrated in the receiving unit. By means of such an embodiment, advantageously at least one measurement variable may be determined in an environment and, in particular, inside the receiving space of the receiving unit. As a result, in particular, an embodiment which is compact and/or which has a reduced number of components may be advantageously achieved and a number of components may be reduced. Alternatively or additionally, it might be conceivable that the sensor unit has an external sensor element which, for example, may be fixed and/or attached and/or positioned on the receiving unit and/or connected in a different expedient manner to the receiving unit.

It is further proposed that the sensor unit has at least one temperature sensor.

Advantageously, at least one sensor element of the sensor unit is configured as a temperature sensor. As a result, advantageously a temperature, for example a temperature of a food to be cooked, may be determined by the sensor unit as a measurement variable and, for example, processed for an output to a user and/or for an, in particular automatic, adaptation of an energy provided by the supply unit. Alternatively or additionally, it is conceivable that at least one sensor element of the sensor unit is configured as a sensor which is different from a temperature sensor. It might be conceivable, for example, that at least one sensor element of the sensor unit is configured, for example, as a weight sensor or as a volume sensor or as a pressure sensor or as a humidity sensor or as a motion sensor or as a further sensor which appears expedient to a person skilled in the art for a use of an induction energy transmission system. It is also conceivable that at least one further sensor element of the sensor unit is configured as a further temperature sensor.

According to a further advantageous embodiment of the present invention, it is proposed that the induction energy transmission system comprises at least one third information channel for transmitting at least one third signal between the receiving unit and the supply unit, which third signal codes a further measurement variable. The third information channel, in particular, may have common units with the second information channel, in particular a common supply induction element and a common reception induction element. The third information channel differs from the second information channel, in particular, by the third signal which is different from the second signal. A carrier frequency of the third signal could, in particular, be a further frequency, which is different from a carrier frequency of the second signal, of an electromagnetic alternating field provided by the supply induction element, for example a network frequency. The third signal, for example, could be modulated in particular by a frequency modulation and/or an amplitude modulation and/or a duty cycle modulation to the further carrier frequency. Alternatively or additionally, for example, it might be conceivable that the second signal is transmitted by a first modulation, for example by frequency modulation of a carrier frequency, and the third signal is transmitted via a second additional modulation, for example via an amplitude modulation of the same carrier frequency. As a result, in particular, a further measurement variable may be advantageously transmitted between the receiving unit and the supply unit. As a result, in particular, an error-free transmission of a further measurement variable between the supply unit and the receiving unit may be ensured. Moreover, in particular, a high level of convenience for a user may be advantageously provided.

The invention is further based on a method for operating an induction energy transmission system, in particular an induction cooking system, having at least one supply unit which has at least one supply induction element, and having at least one receiving unit, wherein energy is inductively provided by the supply induction element in at least one operating state, which energy is at least partially received by the receiving unit, and at least one measurement variable is detected, which measurement variable is coded in a first signal and is transmitted by a first information channel between the supply unit and the receiving unit.

It is proposed that the at least one measurement variable is coded in a second signal and is transmitted between the supply unit and the receiving unit by at least one second information channel which is different from the first information channel. As a result, an operating reliability may be increased.

The induction energy transmission system in this case is not intended to be limited to the above-described use and embodiment. In particular, for fulfilling a mode of operation described herein the induction energy transmission system may have a number of individual elements, components and units which is different from a number mentioned herein.

BRIEF DESCRIPTION OF THE DRAWINGS

Further advantages emerge from the following description of the drawing. Exemplary embodiments of the invention are shown in the drawing. The drawing, the description and the claims contain numerous features in combination. The person skilled in the art will also expediently consider the features individually and combine them to form further meaningful combinations. In the drawing:

DETAILED DESCRIPTION OF EXEMPLARY EMBODIMENTS OF THE PRESENT INVENTION

Figure 1:
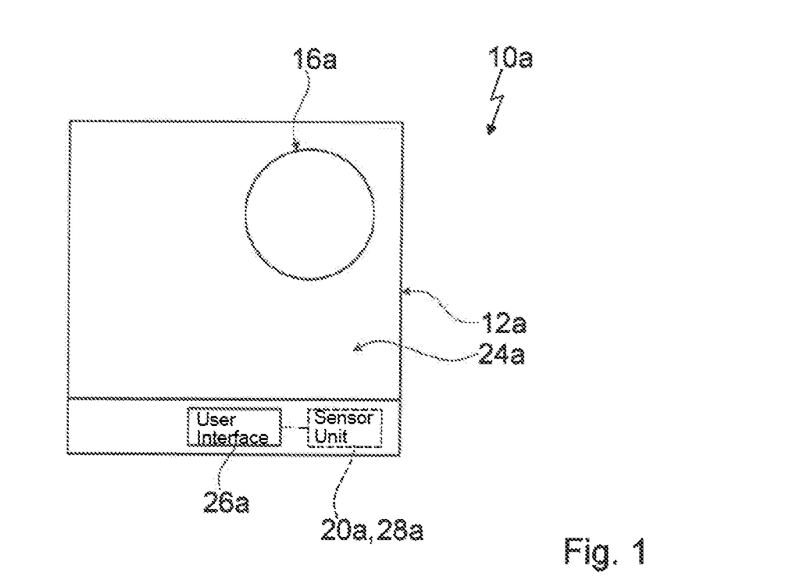
FIG. 1 shows an induction energy transmission system with a supply unit and a receiving unit, in a schematic plan view.
Figure 2:
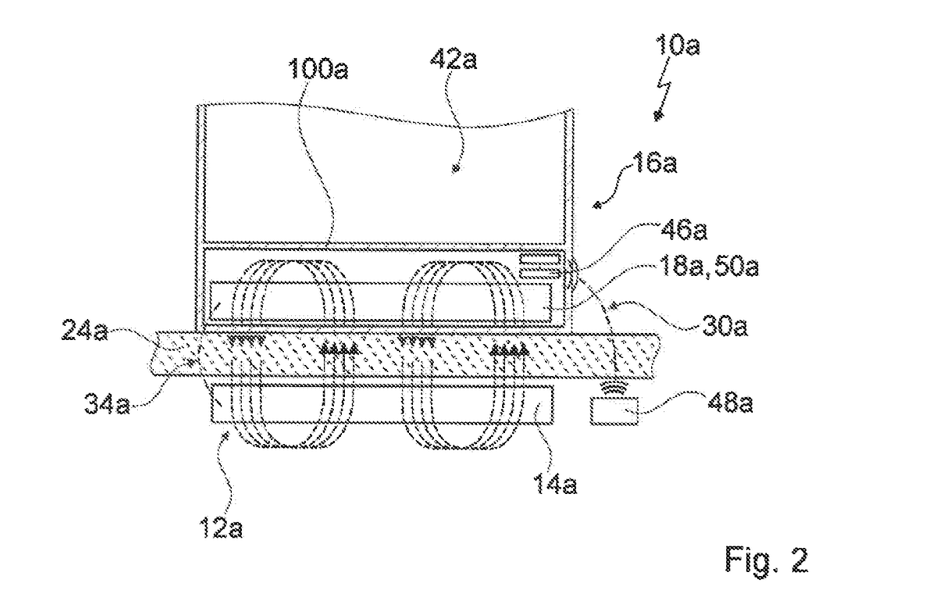
FIG. 2 shows the induction energy transmission system with a first information channel for transmitting a first signal and with a second information channel for transmitting a second signal, in a schematic sectional view.
Figure 3:
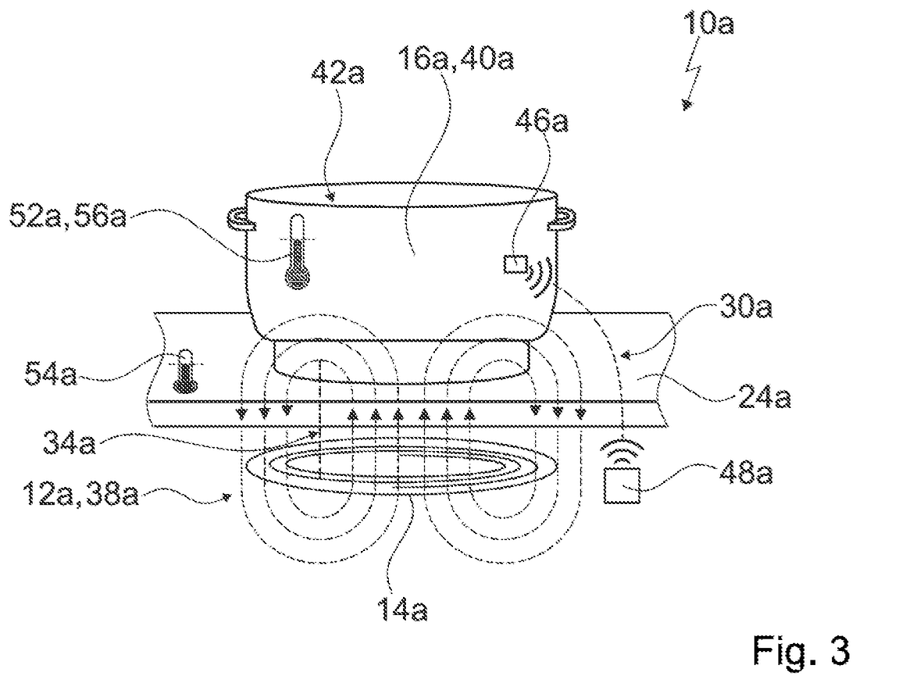
FIG. 3 shows the induction energy transmission system with a supply unit configured as a cooking appliance.

FIG. 1 shows a plan view of an induction energy transmission system 10a which is configured as an induction cooking system. FIGS. 2 and 3 show lateral views of the induction energy transmission system 10a, partially in sectional view.

In the present exemplary embodiment, the induction energy transmission system 10a is configured as an induction cooktop system. The induction energy transmission system 10a has a supply unit 12a which is configured as an induction supply unit. The supply unit 12a is configured as a cooking appliance 38a, in particular as a cooktop and namely as an induction cooktop. In the present exemplary embodiment the supply unit 12a has a positioning plate 24a.

In a mounted state, the positioning plate 24a forms a visible surface which in a mounted state is arranged, in particular, facing a user. The positioning plate 24a is provided for positioning a receiving unit 16a of the induction energy transmission system 10a, and namely an item of cookware 40a for heating. In the present exemplary embodiment, the positioning plate 24a is configured as a cooktop plate. The receiving unit 16a which is configured as an item of cookware 40a has at least one receiving space 42a and at least one base plate 100a. In at least one operating state, food is located in the receiving space 42a, said food being cooked in a particularly efficient and/or targeted manner by the energy provided by a supply induction element 14a and received by the receiving unit 16a.

The supply unit 12a has a user interface 26a for an input and/or selection of operating parameters, for example a heating power and/or a heating power density and/or a heating zone. The user interface 26a is provided for an output of a value of an operating parameter to a user.

The supply unit 12a has a control unit 28a. The control unit 28a is provided to perform actions and/or to change settings as a function of operating parameters input by means of the user interface 26a. In an operating state, the control unit 28a controls an energy supply to at least one supply induction element 14a of the supply unit 12a.

Preferably, the supply unit 12a has a plurality of supply induction elements 14a. In the present exemplary embodiment, the supply induction elements 14a are arranged in the form of a matrix (not shown). Alternatively, the supply unit 12a could have a different number of supply induction elements 14a. The supply induction elements 14a could be arranged, for example, in a manner which is different from an arrangement in the form of a matrix. Only one of the supply induction elements 14a is shown in the figures. Hereinafter only one of the supply induction elements 14a is described.

The supply induction element 14a is provided to heat the receiving unit 16a which is positioned on the positioning plate 24a above the supply induction element 14a. The supply induction element 14a is configured as an induction heating element. The supply induction element 14a is arranged in an installed position below the positioning plate 24a (see FIG. 2).

In the operating state, the supply induction element 14a provides energy inductively. In the operating state, the supply induction element 14a provides energy inductively for heating at least one part of the receiving unit 16a. The receiving unit 16a has at least one receiving induction element 18a. The receiving induction element 18a of the receiving unit 16a is configured as a secondary coil and in the operating state receives a part of the energy provided by the supply induction element 14a. The receiving unit 16a comprises at least one electrical heating element (not shown) which is operated with a part of the energy received by the receiving induction element 18a and is provided for heating at least one food to be cooked which is located in the receiving space 42a. With a further part of the energy received by the supply induction element 14a, the receiving induction element 18a supplies at least one further unit, in particular a sensor unit 20a. In the present exemplary embodiment, the receiving induction element 18a is additionally configured as a reception induction element 50a and also receives in at least one operating state, in addition to the part of the energy provided by the supply induction element 14a, at least one piece of information which is coded, in particular, in a second signal 36a and/or in a third signal 92a.

The induction energy transmission system 10a has the sensor unit 20a. The sensor unit 20a serves for detecting at least one measurement variable 22a. The sensor unit 20a has at least one first sensor element 52a. The first sensor element 52a is configured as a temperature sensor 56a and is part of the receiving unit 16a (see FIG. 3). The temperature sensor 56a measures a temperature inside the receiving space 42a, for example in order to be able to set an optimal heating power for cooking a food to be cooked which is located in the receiving space 42a. In the present exemplary embodiment, the sensor unit 20a has at least one second sensor element 54a. The second sensor element 54a is part of the supply unit 12a and is integrated in the positioning plate 24a. The second sensor element 54a is configured as a further temperature sensor. The second sensor element 54a measures a temperature of a surface of the positioning plate 24a facing a user, for example in order to warn the user of a possible risk of burning due to a high temperature of the positioning plate 24a.

The induction energy transmission system 10a has at least one first information channel 30a. The first information channel 30a serves for transmitting a first signal 32a between the receiving unit 16a and the supply unit 12a. The first signal 32a codes the measurement variable 22a. The induction energy transmission system 10a also has at least one second information channel 34a which is different from the first information channel 30a and which is provided for transmitting a second signal 36a between the receiving unit 16a and the supply unit 12a. In this case the second signal 36a also codes the measurement variable 22a.

The induction energy transmission system 10a has at least one radio transmitter 46a and at least one radio receiver 48a which are assigned to the first information channel 30a. The radio transmitter 46a transmits the first signal 32a, which is configured as a radio signal, to the radio receiver 48a. A transmission of the first signal 32a takes place between the radio transmitter 46a and the radio receiver 48a according to the Bluetooth standard.

The second information channel 34a comprises the supply induction element 14a and at least the receiving induction element 18a of the receiving unit 16a which is configured as the reception induction element 50a. The supply induction element 14a transmits the second signal 36a to the reception induction element 50a of the receiving unit 16a.

In the present exemplary embodiment, the second signal 36a is a harmonic of an energy transmission signal which is transmitted in the operating state from the supply induction element 14a to the receiving induction element 18a of the receiving unit 16a which is configured as the reception induction element 50a. In the present exemplary embodiment, the second signal 36a is frequency modulated (see FIG. 4). Additionally, in the present exemplary embodiment the second signal 36a is amplitude modulated. Alternatively or additionally, the second signal 36a could be duty cycle modulated.

Figure 4:
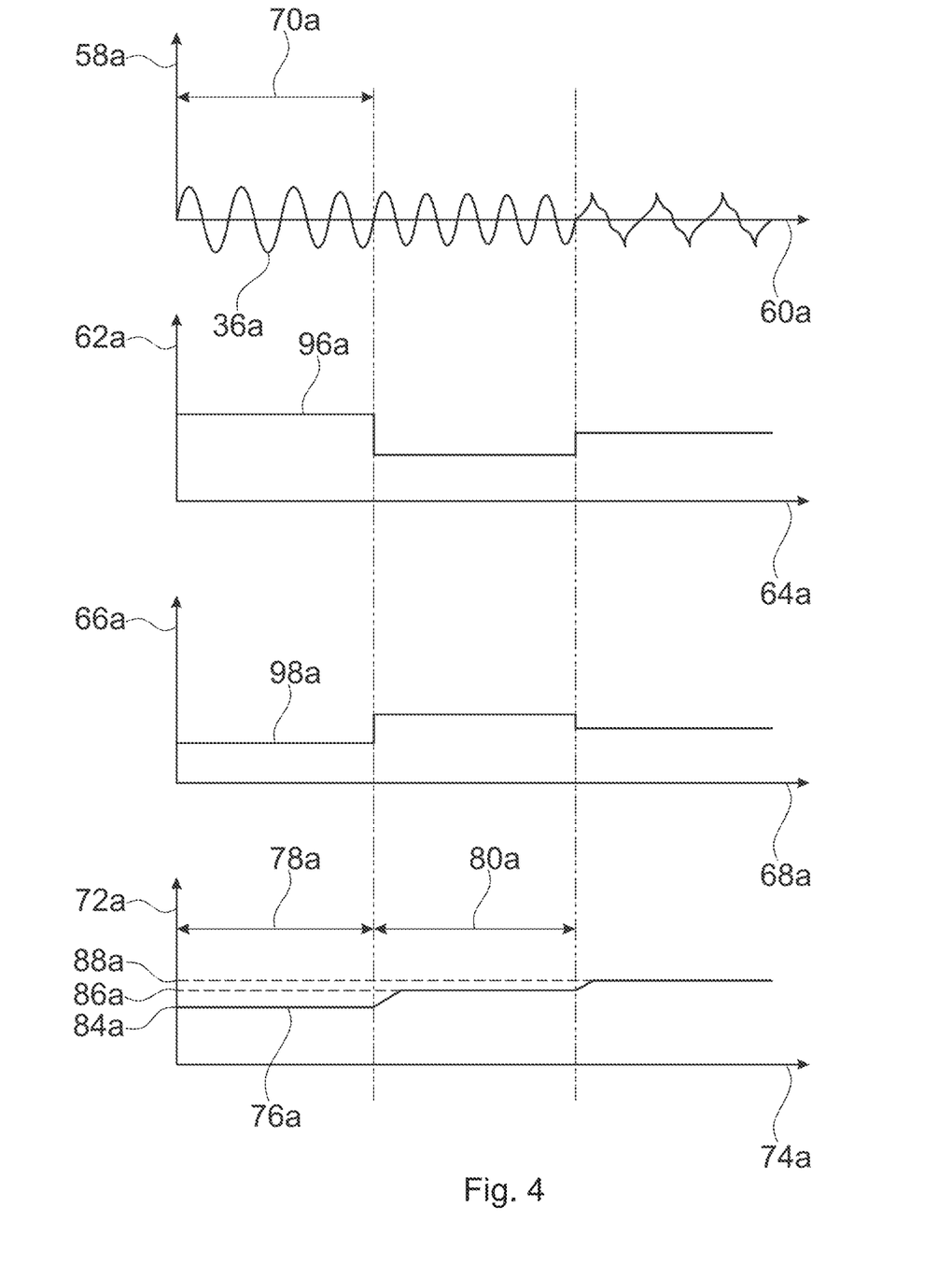
FIG. 4 shows an overall view of four diagrams in which the second signal, an amplitude of the second signal, a frequency of the second signal and a measurement variable in each case are plotted over a time, in a schematic view.

FIG. 4 shows an overall view of four diagrams. The second signal 36a is plotted on an ordinate axis 58a of a first diagram. A time is plotted on an abscissa axis 60a of the first diagram. An amplitude 96a of the second signal 36a is plotted on an ordinate axis 62a of a second diagram. A time is plotted on an abscissa axis 64a of the second diagram. A frequency 98a of the second signal 36a is plotted on an ordinate axis 66a of a third diagram. A time is plotted on an abscissa axis 68a of the third diagram. The measurement variable 22a is plotted in the form of a measurement variable characteristic curve 76a on an ordinate axis 72a of a fourth diagram. A time is plotted on an abscissa axis 74a of the fourth diagram.

The second signal 36a has a specific duration and/or a specific number of oscillations. In particular, the second signal 36a has a minimum duration 70a which the second signal 36a in particular should at least adopt. For example, the minimum duration 70a could result from an inertia in a transmission of energy and/or advantageously a transmission of the second signal 36a.

During the minimum duration 70a, the amplitude 96a and the frequency 98a of the second signal 36a in each case remain constant and code a first measurement variable value 84a of the measurement variable 22a.

It may be derived from FIG. 4 that in the present exemplary embodiment after a minimum duration 70a is exceeded, the second signal 36a changes over a further progression of the time plotted on the abscissa axis 60a and that the measurement variable characteristic curve 76a changes over a progression of the time plotted on the abscissa axis 74a. During a first time period which in the present case corresponds to the minimum duration 70a, the measurement variable characteristic curve 76a has a constant progression and represents the first measurement variable value 84a of the measurement variable 22a which is plotted on the ordinate axis 72a. After the minimum duration 70a has elapsed, the second signal 36a has changed due to a change in the modulation of the amplitude 96a and the frequency 98a. During a second time period which corresponds at least to the minimum duration 70a, the amplitude 96a and the frequency 98a of the second signal 36a once again remain constant and code a second measurement variable value 86a of the measurement variable 22a. During this second time period, the progression of the measurement variable characteristic curve 76a also remains constant and thus represents the second measurement variable value 86a which is plotted on the ordinate axis 72a. After the second time period has elapsed, the second signal 36a has changed again due to a further change in the modulation of the amplitude 96a and the frequency 98a. During a third time period which corresponds at least to the minimum duration 70a, the amplitude 96a and the frequency 98a of the second signal 36a once again remain constant and thus code a third measurement variable value 88a of the measurement variable 22a which is plotted on the ordinate axis 72a.

The measurement variable characteristic curve 76a shown in FIG. 4 could be, for example, a temperature characteristic curve of a temperature progression inside the receiving unit 16a detected by the temperature sensor 56a of the sensor unit 20. In this case, the first measurement variable value 84a would correspond to a first temperature inside the receiving unit 16a detected within a first time period 78a by the temperature sensor 56a. The second measurement variable value 86a would in this case correspond to a second temperature within a subsequent second time period 80a detected by the temperature sensor 56a of the sensor unit 20.

Figure 5:
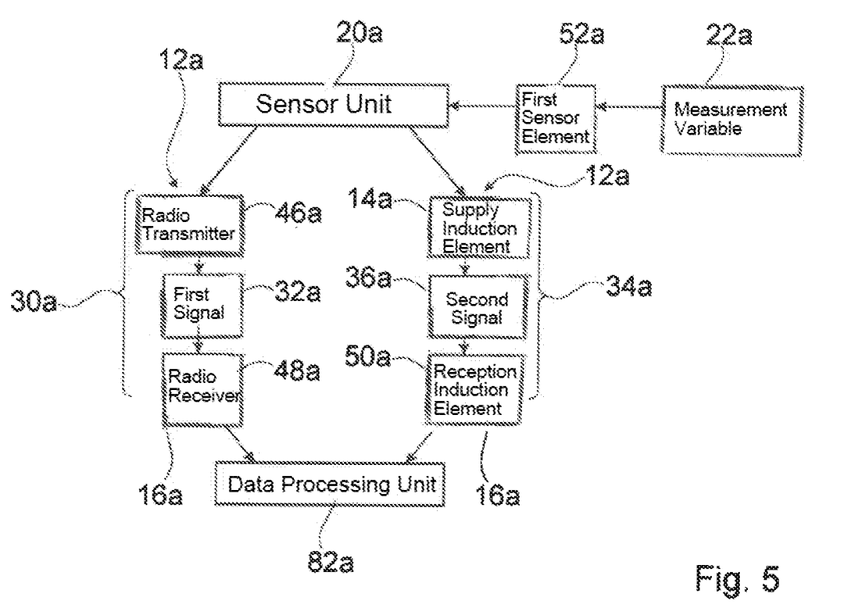
FIG. 5 shows a diagram of a method for operating the induction energy transmission system, in a schematic view.

FIG. 5 shows a transmission of the first signal 32a and the second signal 36a schematically in a block diagram. At least the measurement variable 22a is initially detected by means of the first sensor element 52a, converted into an electrical signal and processed by the sensor unit 20a. The sensor unit 20a transmits the measurement variable 22a to the radio transmitter 46a. The radio transmitter 46a transmits the first signal 32a, which codes the measurement variable 22a, to the radio receiver 48a. In the present exemplary embodiment, the first signal 32a is a radio signal and, in particular, a Bluetooth signal. The radio receiver 48a converts the first signal 32a received from the radio transmitter 46a into an electrical signal and transmits it to a data processing unit 82a. In the present exemplary embodiment, the radio transmitter 46a, the first signal 32a and the radio receiver 48a form the first information channel 30a. The sensor unit 20a also transmits the measurement variable 22a to the supply induction element 14a of the supply unit 12a. The supply induction element 14a transmits the second signal 36a, which codes the measurement variable 22a, to the reception induction element 50a of the receiving unit 16a. In the present exemplary embodiment, the second signal 36a is an induction signal. The reception induction element 50a converts the second signal 36a into an electrical signal and transmits it to the data processing unit 82a. In the present exemplary embodiment, the supply induction element 14a of the supply unit 12a, the reception induction element 50a of the receiving unit 16a and the second signal 36a form the second information channel 34a. The data processing unit 82a compares information transmitted by means of the first information channel 30a relative to the measurement variable 22a with information transmitted by means of the second information channel 34a relative to the measurement variable 22a.

Figure 6:
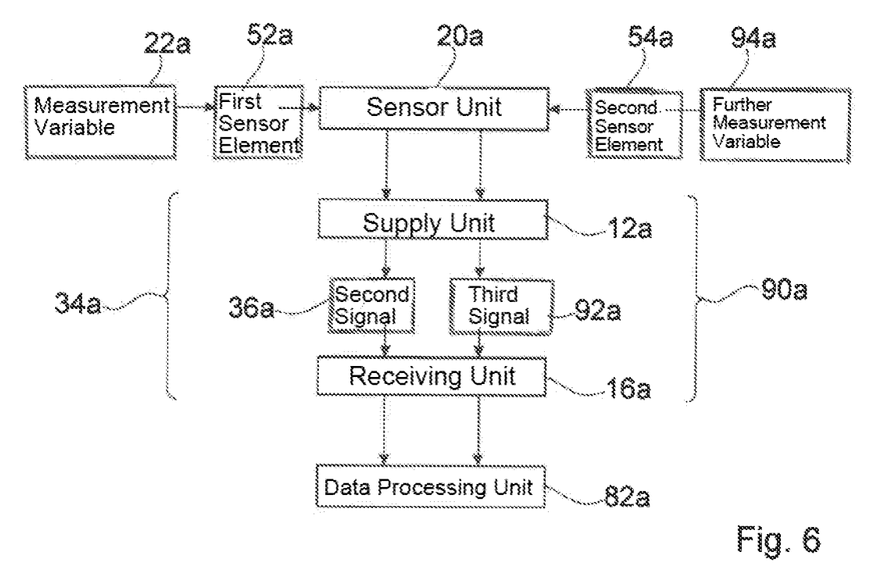
FIG. 6 shows a diagram of a further method for operating the induction energy transmission system, in a schematic view.

FIG. 6 shows a variant of the present exemplary embodiment for a transmission of the second signal 36a and for an additional transmission of the third signal 92a, schematically in a further block diagram. The first measurement variable 22a is initially detected by means of the first sensor element 52a, converted into an electrical signal and processed by the sensor unit 20a. A further measurement variable 94a is detected by means of the second sensor element 54a and processed by the sensor unit 20a. The sensor unit 20a transmits the measurement variable 22a and the further measurement variable 94 to the supply unit 12a. The measurement variable 22a is coded by the second signal 36a and transmitted via the second information channel 34a to the receiving unit 16a. The further measurement variable 94a is coded by the third signal 92a and transmitted via a third information channel 90a to the receiving unit 16a. The receiving unit 16a transmits the measurement variable 22a and the further measurement variable 94a to the data processing unit 82a.

The third information channel 90a comprises at least part of the receiving unit 16a, at least part of the supply unit 12a and the third signal 92a. In the present exemplary embodiment, the second signal 36a and the third signal 92a in each case are modulated to the energy transmission signal which the supply induction element 14a transmits in the operating state to the receiving induction element 18a of the receiving unit 16a configured as the reception induction element 50a. The third signal 92a in this case is a further harmonic of the energy transmission signal in a frequency range which is different from the second signal 36a. In the present exemplary embodiment, the third signal 92a is frequency modulated and amplitude modulated. The modulation of the frequency 98a and the amplitude 96a, shown schematically in FIG. 4 for the second signal 36a, may also expediently apply to the third signal 92a. Alternatively or additionally, the third signal 92a could be duty cycle modulated. In a method for an operation of the induction energy transmission system 10a, in the operating state energy is inductively provided by means of the supply induction element 14a. In the operating state, a part of the energy provided by the supply induction element 14a is received by the receiving unit 16a. At least the measurement variable 22a is detected by means of the sensor element 52a of the sensor unit 20a, coded in the first signal 32a and transmitted by the first information channel 30a between the supply unit 12a and the receiving unit 16a. The at least one measurement variable 22a is coded in the second signal 36a and transmitted via the second information channel 34a between the supply unit 12a and the receiving unit 16a (see FIG. 5).

Figure 7:
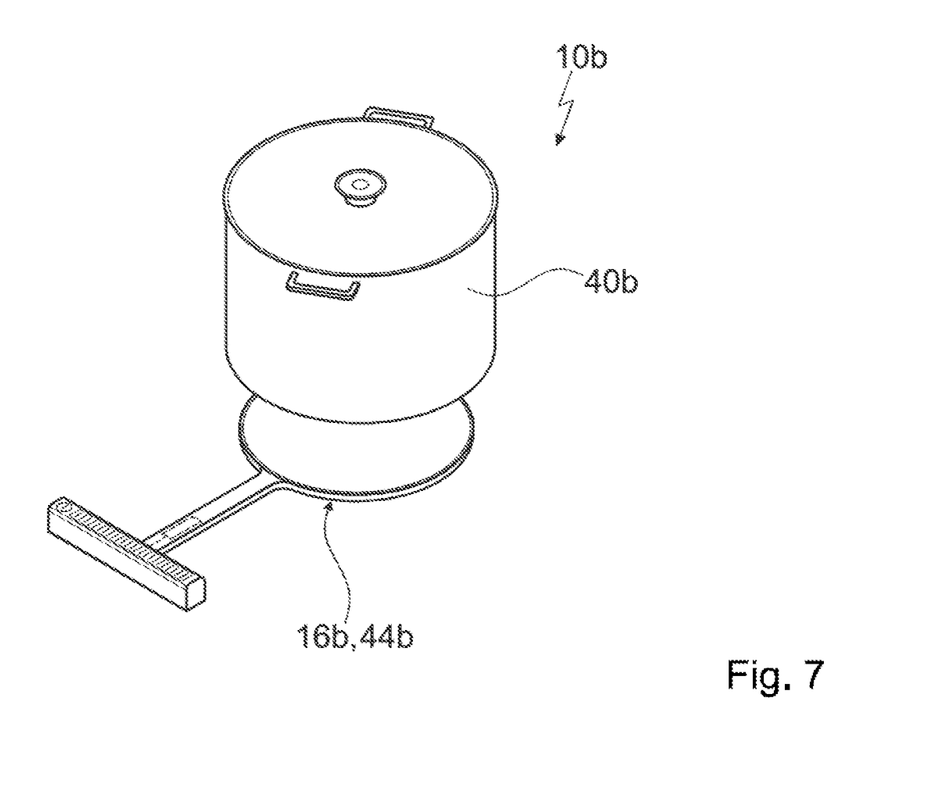
FIG. 7 shows a receiving unit of an alternative exemplary embodiment of an induction energy transmission system, in a schematic view.

A further exemplary embodiment of the invention is shown in FIG. 7. The following description is substantially limited to the differences between the exemplary embodiments, wherein relative to components, features and functions which remain the same, reference is made to the description of the exemplary embodiment of FIGS. 1 to 6. For differentiating between the exemplary embodiments the letter a in the reference numerals of the exemplary embodiment in FIGS. 1 to 6 is replaced by the letter b in the reference numerals of the exemplary embodiment of FIG. 7. Relative to components denoted the same, in particular relative to components with the same reference numerals, in principle reference may also be made to the drawings and/or the description of the exemplary embodiment of FIGS. 1 to 6.

FIG. 7 shows a receiving unit 16b of an alternative induction energy transmission system 10b. The receiving unit 16b is configured as a support unit 44b for positioning an item of cookware 40b. Apart from an inductive heating, the receiving unit 16b has the functionality of the receiving unit 16a of the previous exemplary embodiment. In the present case, the inductive heating takes place directly in a cookware base of the item of cookware 40b.

The invention claimed is:

1. An induction energy transmission system, comprising:
a supply unit comprising a supply induction element configured to inductively provide energy in an operating state;
a receiving unit configured to receive at least part of the energy provided by the supply induction element in the operating state;
a first sensor unit configured to detect a first measurement variable, wherein the first measurement variable is time-dependent;
a first information channel configured to transmit a first signal between the receiving unit and the supply unit, wherein the first signal comprises the first measurement variable; and
a second information channel which differs from the first information channel and is configured to transmit a second signal between the receiving unit and the supply unit, wherein the second signal comprises the first measurement variable.

2. The induction energy transmission system of claim 1, constructed in the form of an induction cooking system.

3. The induction energy transmission system of claim 1, wherein the supply unit is configured as a cooking appliance.

4. The induction energy transmission system of claim 1, wherein the receiving unit is configured as an item of cookware.

5. The induction energy transmission system of claim 1, wherein the receiving unit is configured as a support unit for positioning an item of cookware.

6. The induction energy transmission system of claim 1, wherein the first information channel comprises a radio transmitter for transmitting the first signal and a radio receiver receiving the first signal.

7. The induction energy transmission system of claim 6, wherein a transmission of the first signal takes place between the radio transmitter and the radio receiver according to a Bluetooth standard.

8. The induction energy transmission system of claim 1, wherein the receiving unit comprises a reception induction element, said second information channel comprising the supply induction element and the reception induction element of the receiving unit.

9. The induction energy transmission system of claim 1, wherein the second signal is frequency modulated and/or amplitude modulated and/or duty cycle modulated.

10. The induction energy transmission system of claim 1, wherein the first sensor unit comprises a sensor element which is integrated in the supply unit.

11. The induction energy transmission system of claim 10, wherein the first sensor unit comprises a second sensor element which is integrated in the receiving unit.

12. The induction energy transmission system of claim 1, wherein the first sensor unit comprises a temperature sensor.

13. The induction energy transmission system of claim 1, further comprising a second sensor unit configured to detect a second measurement variable, and a third information channel configured to transmit a third signal between the receiving unit and the supply unit, wherein the third signal comprises the second measurement variable.

14. The induction energy transmission system of claim 13, wherein the receiving unit comprises a reception induction element, wherein the second information channel and the third information channel comprise the supply induction element and the reception induction element of the receiving unit, and wherein the second information channel uses a first modulation and the third information channel uses a second modulation.

15. A method for operating an induction energy transmission system, said method comprising:

inductively providing energy by a supply unit of the induction energy transmission system in an operating state;

transmitting the energy at least partially to a receiving unit of the induction energy transmission system;

detecting a first measurement variable, wherein the first measurement variable is time-dependent;

coding the first measurement variable in a first signal transmitted by a first information channel between the supply unit and the receiving unit; and coding the first measurement variable in a second signal transmitted between the supply unit and the receiving unit by a second information channel which is different from the first information channel.

16. The method of claim 15 for operating an induction cooking system.

17. A method for operating an induction energy transmission system, said method comprising:

inductively transmitting energy from a supply unit of the induction energy transmission system to a receiving unit of the induction energy transmission system and heating the receiving unit;

detecting a first measurement variable, wherein the first measurement variable is time-dependent;

transmitting a first signal by a first information channel between the supply unit and the receiving unit, wherein the first signal comprises the first measurement variable; and transmitting a second signal by a second information channel between a supply induction element of the supply unit and a reception induction element of the receiving unit, wherein the second signal comprises the first measurement variable, wherein the second information channel is different from the first information channel.

18. The method of claim 17, further comprising comparing a first value of the first measurement variable received from the second information channel and a second value of the first measurement variable received from the first information channel.

* * * * *